Oct. 14, 1952 C. B. LEACH 2,613,656
BELLEVILLE ROTATOR AND SPRING SURGE DAMPER
Filed Feb. 23, 1950

Inventor
Clayton B. Leach
By
Willits, Helmig & Baillio
Attorneys

Patented Oct. 14, 1952

2,613,656

UNITED STATES PATENT OFFICE 2,613,656

BELLEVILLE ROTATOR AND SPRING SURGE DAMPER

Clayton B. Leach, Pontiac, Mich., assignor to General Motors Corporation, Detroit, Mich., a corporation of Delaware Application February 23, 1950, Serial No. 145,745

8 Claims. (Cl. 123—90)

This invention relates to poppet valve mechanisms of internal combustion engines and has as its principal object to provide improved means for damping valve spring surge and effecting rotation of the valves in operation.

A more specific object of the invention is to provide the aforementioned means in the form of a Belleville type spring in thrust transmitting relation between one end of the usual coil return spring and a normally oiled abutment surface, whereby the Belleville spring operates to control the transmission of rotative effort from the coil spring to the valve to effect an ultimate progressive rotation of the valve in one direction simultaneously with its reciprocation.

Figure 1:
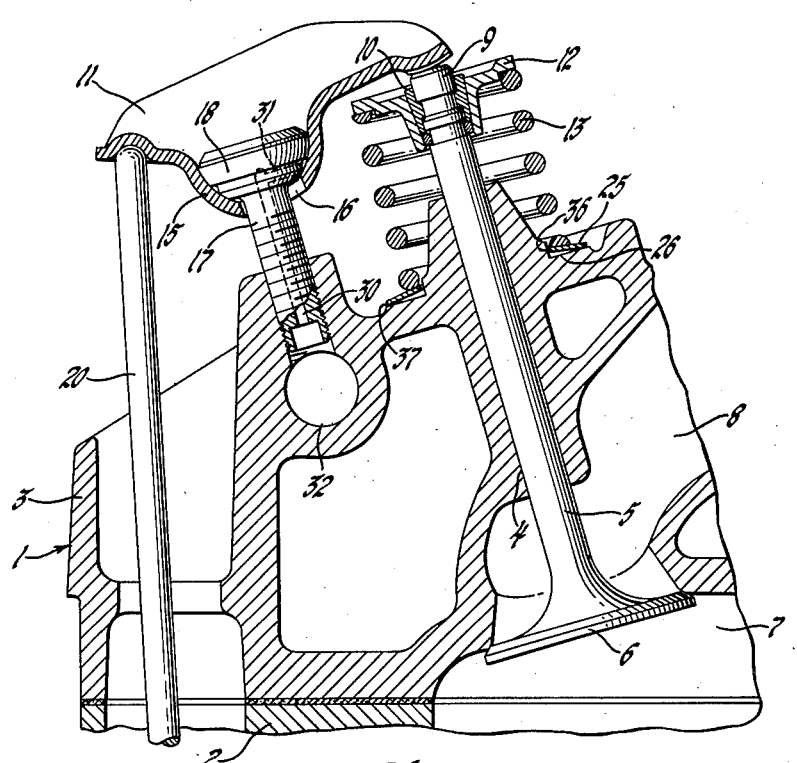
Figure 1 is a view of an internal combustion engine, partly in transverse section and partly in elevation, incorporating the valve rotating and valve spring damping means of my invention.

Referring now to the drawings in detail, the numberal 1 designates generally the frame of a valve-in-head type internal combustion engine including a cylinder block 2 and cylinder head 3. Guided for reciprocation and rotation by a bore 4 formed in the cylinder head is the stem 5 of a poppet valve 6 which normally closes communication between the combustion chamber 7 and the valve port 8. The valve stem has its upper end 9 in abutment with one end of a valve operator such as the rocker 11. Fixedly anchored as by conventional split locks 10 to the valve stem 5 adjacent its upper end 9 is a retainer or washer 12 against which abuts the upper end of the usual coil valve return spring 13 normally holding the valve 6 in closed position. In the particular engine shown the valve rocker 11 is of stamped sheet metal construction with a depressed socket portion 15 having an aperture 16 through which extends a tension stud 17 threadedly anchored in the cylinder head 3. The upper end of this stud has a part-spherical head 18 fitting the internal surface of the socket portion 15 and forming a bearing about which the rocker 11 is adapted to fulcrum in effecting reciprocation of the valve 6. Pivoted to and thrustably supporting the opposite end of the rocker 11 is a push rod 20 which transmits the valve lifting force in conventional manner from a rotary cam (not shown).

Thrust reaction means for the lower end of the coil spring 13 is provided by a Belleville spring 25 which is in direct thrust transmitting relation with the lower end of the coil spring and a normally oiled abutment surface 26 on the cylinder head. If desired, the surface 26 may be specially supplied with oil by a tube or other conveying means (not shown) directly from the engine oil pressure system, however the normal coating of oil which the cylinder head receives as the result of drippings from the valve and valve rocker lubrication will probably provide a sufficient supply of oil to the surface 26 for the purposes of my invention. In the case of the particular valve rocker 11 shown, lubrication of the socket 15 and stud head 18 is provided for by drilled passages 30 and 31 through which oil passes from the rocker oil gallery 32, and this oil drains through the aperture 16 and drops down upon the upper surface of the cylinder head in sufficient volume to insure ample covering of the Belleville spring seating surface 26.

The inner marginal edge of the surface 26 is defined by a shoulder 36 and the inner periphery of the Belleville spring 25 journals on this shoulder.

Figure 2:
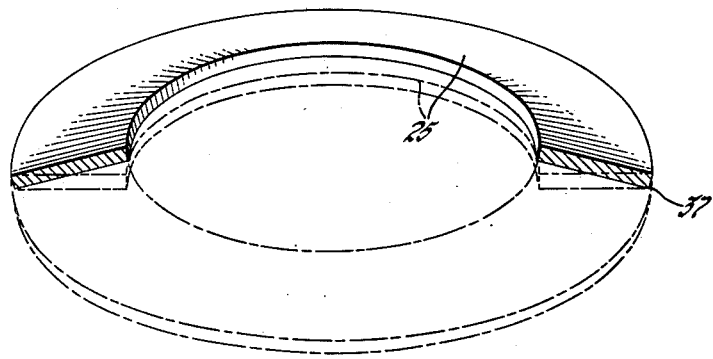
Figure 2 is an enlarged perspective view of the Belleville spring employed in the assembly of Figure 1, with portions broken away and in section and illustrating its manner of flexure in operation.

The Belleville spring 25 has a normally dished configuration as shown in solid lines in Figure 2 and the pressure exerted thereon by the coil spring 13 when the valve is closed (Figure 1) is insufficient to flatten the Belleville spring against the abutment surface 26 of the cylinder head. Hence, when the valve is in closed position the outer bottom edge 37 of the Belleville spring effects a substantially line contact with the surface 26 with sufficient pressure to restrain rotation of the Belleville spring about the stem 9. As the load imposed on the Belleville spring by the coil spring 13 increases as the valve is driven toward open position, the Belleville spring collapses, i. e., deflects to a flattened configuration parallel with the surface 26. The oil on the surface 26 during this action is temporarily trapped between the surface 26, shoulder 36 and the Belleville spring 25, and pending its escape from under the Belleville spring serves to float the Belleville spring with practically negligible resistance to rotation. This delay in the escape of the oil and resultant floating of the Belleville spring is of limited duration, and after the oil has sufficiently escaped from under the Belleville spring, the Belleville spring regains its frictional resistance against rotation with the surface 26 and prevents further rotation of the lower end of the valve spring 13.

The operational sequence of events during each cycle of valve reciprocation is therefore substantially as follows:

Beginning with the valve in closed position at the start of its valve opening stroke, both the upper and lower ends of the coil spring are rotatively stationary. As the valve begins moving downwardly toward open position, the lower end of the coil spring is restrained from rotating by the frictional resistance applied thereto by the Belleville spring which is in rotative gripping relation with the normally oiled surface 26 of the cylinder head, and the windup of the coil spring in response to its axial displacement causes the retainer 12 and the valve 6 to rotate in a clockwise direction (for a right-hand wound spring 13). Upon the Belleville spring being deflected sufficiently to float on the oil covering the surface 26, the lower end of the coil spring is then released to rotate and further clockwise rotation of the upper end of the coil spring stops. Prior to the valve reaching its fully open position sufficient oil will have escaped from under the Belleville spring to re-establish a non-rotating relation between the Belleville spring and surface 26, following which the upper end of the coil spring will re-commence to rotate. Then, during the return stroke of the valve to closed position the Belleville spring will remain frictionally locked against rotation with the surface 26 and the unwinding of the coil spring will cause its upper end to rotate the retainer 12 and valve 6 in a counterclockwise direction.

It will thus be apparent that the use of a Belleville spring in the manner described will serve dually to damp spring surge of the coil return spring and to control the transmission of rotative driving forces to the valve during its reciprocation and thus effect an ultimate progressive rotation of the valve.

While I have shown a specific application of my invention to a valve-in-head engine, this has been done for illustrative purposes only, and many modifications of the particular arrangement shown may be made without departing from the scope of the invention. For example, I have shown the Belleville spring as having an initial or preset dished shaped, whereas alternatively a Belleville spring with an initial flat configuration could be used satisfactorily in cooperation with a dished abutment surface, as well as any intermediate variations between these two extremes. Further, while I have illustrated the invention with the Belleville spring disposed between the coil spring and the engine frame, it is desired to point out that comparable results are obtainable with the Belleville spring interposed between the coil spring and the valve retainer 12—it being only necessary to insure an ample coverage of the Belleville spring abutment surface with oil. Finally, the "term" oil as used in this specification denotes any flowable material used for lubricating purposes.

I claim:

1. In combination with a poppet valve mounted for reciprocation and rotation, valve operating means, valve returning and rotating means including a first spring having one end operatively fixed to the valve and tending to rotate in alternate directions relative to its opposite end as the spring contracts and expands with valve reciprocation, a second spring in series with the first spring and rotatable with said opposite end, a stationary member providing a normally oiled abutment surface for the second spring, said second spring having a surface movable between positions of divergent and parallel relation with said abutment surface in response to increased loading of the springs during which movement oil temporarily trapped between said surfaces releases said second spring for rotation.

2. In combination with a poppet valve, a rigid member relative to which the valve may reciprocate and rotate, valve reciprocating means including a valve return spring displaceable both axially and torsionally in operation, one end of the spring being connected to move with the valve, and thrust reaction means on said member for the opposite end of the spring comprising a resilient member rotatable with said opposite end, said resilient and rigid members having mutually abutting surfaces normally in divergent relatively non-rotative relation, said resilient member being yieldable during each valve operating stroke to effect a parallel relation of said surfaces and thereby release the resilient member for rotation by said spring opposite end.

3. In an internal combustion engine or the like having a guide and a poppet valve slidably supported thereby for reciprocation and rotation, valve reciprocating and rotating means including a coil spring having one end operatively fixed to the valve, thrust reaction means for the spring including a normally oiled generally flat surface terminating around one marginal edge in a shoulder, a normally dished annular plate journaled by said shoulder and resiliently spacing the opposite end of the spring from said surface, said plate being collapsible with increased loading of the spring during which oil pending its escape from between the plate and said surface reduces the frictional resistance to rotation of the plate to less than that imposed on the valve by the guide.

4. In an internal combustion engine or the like, a poppet valve guided for rotation and reciprocation, two valve return springs in series including a coil spring and a Belleville spring each concentric with the valve, said coil spring having its respective ends operatively fixed to the valve and to the Belleville spring, a normally oiled abutment surface for the Belleville spring, said Belleville spring having a face adapted to temporarily trap oil between it and the abutment surface as the Belleville spring yields in response to axial movement of the valve in one direction.

5. The combination with a rotatable poppet valve, valve reciprocating means including a coil return spring having one end rotatable and reciprocable with the valve, and a stationary member having a normally oiled surface, of a Belleville type spring for damping surge of the coil spring and controlling rotation of the opposite end of the coil spring during valve reciprocation, said Belleville type spring being in direct thrust transmitting relation between said coil spring opposite end and the normally oiled surface and adapted to yieldably conform to said surface under increasing thrust loads imposed by the coil spring in operation.

6. In an internal combustion engine or the like, the combination with a poppet valve guided for axial reciprocation and rotation, of a coil spring and a Belleville spring in series with each other and resiliently urging the valve in one axial direction, said Belleville spring and its associated end of the coil spring being rotatable relative to the opposite end of the coil spring as the coil spring contracts and expands during valve reciprocation, and a normally oiled abutment surface upon which the Belleville spring may rotatively float while collapsing in opposition to axial movement of the valve in the opposite direction.

7. In combination with a poppet valve, a normally oil coated rigid member relative to which the valve may reciprocate and rotate, valve reciprocating means including a valve return spring displaceable axially and torsionally in operation, one end of the spring being connected to move with the valve, and thrust reaction means on said member for the opposite end of the spring comprising a resilient member rotatable with said opposite end, said resilient and rigid members having mutually abutting surfaces normally in divergent relatively non-rotative relation, said resilient member being yieldable during each valve operating stroke to increase the mutual abutting area of said surfaces and thereby release the resilient member for rotation by said spring opposite end.

8. The invention defined in claim 7, wherein said resilient member is in the form of a normally dished annular plate and the abutting surface therefor on said rigid member is substantially flat.

CLAYTON B. LEACH.

REFERENCES CITED

The following references are of record in the file of this patent:

UNITED STATES PATENTS

| Number | Name | Date |
|---|---|---|
| 1,534,476 | Wirrer | Apr. 21, 1925 |
| 1,824,734 | Ross | Sept. 22, 1931 |
| 2,397,502 | Ralston | Apr. 2, 1946 |